US009102861B2

(12) United States Patent
Stone et al.

(10) Patent No.: US 9,102,861 B2
(45) Date of Patent: Aug. 11, 2015

(54) CEMENT COMPOSITIONS FOR CEMENTING IN CONFINED LOCALES AND METHODS FOR USE THEREOF

(71) Applicant: Halliburton Energy Services, Inc., Houston, TX (US)

(72) Inventors: Shantel Stone, Houston, TX (US); Charles Landis, Houston, TX (US); Ryan Collins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 328 days.

(21) Appl. No.: 13/628,862

(22) Filed: Sep. 27, 2012

(65) Prior Publication Data

US 2014/0083698 A1    Mar. 27, 2014

(51) Int. Cl.
*E21B 33/13* (2006.01)
*C09K 8/487* (2006.01)
*C04B 28/02* (2006.01)
*C09K 8/467* (2006.01)

(52) U.S. Cl.
CPC .............. *C09K 8/487* (2013.01); *C04B 28/02* (2013.01); *C09K 8/467* (2013.01); *E21B 33/13* (2013.01)

(58) Field of Classification Search
CPC .. C04B 103/10; C04B 2103/40; C09K 8/487; E21B 33/13
USPC .................................. 166/285, 292, 293, 294
See application file for complete search history.

(56) References Cited

U.S. PATENT DOCUMENTS

| | | | | |
|---|---|---|---|---|
| 3,062,293 | A | * | 11/1962 | Parsons ........................ 166/155 |
| 3,359,225 | A | | 12/1967 | Weisend |
| 4,015,991 | A | | 4/1977 | Persinski et al. |
| 4,234,344 | A | * | 11/1980 | Tinsley et al. ................ 106/672 |
| 4,515,635 | A | | 5/1985 | Rao et al. |
| 4,555,269 | A | | 11/1985 | Rao et al. |
| 4,676,317 | A | | 6/1987 | Fry et al. |
| 4,687,516 | A | | 8/1987 | Burkhalter et al. |
| 4,703,801 | A | | 11/1987 | Fry et al. |
| 4,818,288 | A | | 4/1989 | Aignesberger et al. |

(Continued)

FOREIGN PATENT DOCUMENTS

| | | |
|---|---|---|
| WO | 03007443 A1 | 1/2003 |
| WO | 2003/074443 A1 | 9/2003 |
| WO | 2014052086 A1 | 4/2014 |

OTHER PUBLICATIONS

Halliburton article entitled "CFR-3™ and CFR-3L™ Dispersant," 2012.

(Continued)

*Primary Examiner* — Zakiya W Bates
*Assistant Examiner* — Silvana Runyan
(74) *Attorney, Agent, or Firm* — McDermott Will & Emery LLP; Holly Soehnge

(57) ABSTRACT

When conducting cementing operations within confined locales, such as the annular space within a wellbore, it can sometimes be difficult to successfully deliver an uncured cement composition to a desired location. Cementing methods can comprise: providing a cement composition comprising a cement and a property control package, the property control package comprising: a filtration control agent; a friction reducer; and a setting accelerator; introducing the cement composition into a mineral exploration wellbore; and setting the cement composition in the wellbore.

21 Claims, 6 Drawing Sheets

(56) References Cited

U.S. PATENT DOCUMENTS

| | | | |
|---|---|---|---|
| 5,339,903 | A | 8/1994 | Eoff et al. |
| 5,343,951 | A * | 9/1994 | Cowan et al. .............. 166/293 |
| 6,268,406 | B1 | 7/2001 | Chatterji et al. |
| 6,681,856 | B1 | 1/2004 | Chatterji et al. |
| 7,478,675 | B2 | 1/2009 | Roddy et al. |
| 7,617,870 | B1 | 11/2009 | Roddy et al. |
| 7,674,332 | B2 | 3/2010 | Roddy et al. |
| 2004/0262000 | A1 | 12/2004 | Morgan et al. |
| 2006/0108150 | A1 | 5/2006 | Luke et al. |
| 2012/0024527 | A1 | 2/2012 | Tarafdar et al. |

OTHER PUBLICATIONS

Halliburton article entitled "Halad®-344 Fluid Loss Additive," 2007.

Smith, Dwight K., "Cementing," Revised Edition, Second Printing 1990, Society of Petroleum Engineers Inc., Henry L. Doherty Memorial Fund of AIME, New York City.

International Search Report and Written Opinion for PCT/US2013/060038 dated Dec. 16, 2013.

Official Action for Australian Patent Application No. 2013323976 dated Apr. 30, 2015.

* cited by examiner

CEMENT COMPOSITIONS FOR CEMENTING IN CONFINED LOCALES AND METHODS FOR USE THEREOF

BACKGROUND

The present invention generally relates to cementing, and, more specifically, to methods for cementing within confined locales and cement compositions adapted for the same.

Cement is a binding material that may be used in a number of different applications to form structures having high mechanical strength. Hydraulic cements, which cure or set through chemical reactions initiated by contact of a dry cement with water, are very commonly used in structural applications. The terms "cure," "set," and variants thereof will be used interchangeably herein. Typically, a dry cement and water are combined to form a cement slurry, which may then be directly formed into a desired shape or pumped to a desired location before being formed into a desired shape and set into a hardened state.

Cements are commonly used in the drilling industry for the completion and repair of oil and gas wells. For example, cements can be used for securing the drilling pipe (i.e., the drill string) in a wellbore. In primary cementing operations, a cement slurry may be introduced to the annular space between the drilling pipe and the exterior walls of the wellbore, with the cement slurry thereafter being allowed to set into a hardened state. The cement slurry may be introduced directly to the annular space or indirectly by forcing it down the drilling pipe and back up the annular space. Not only does the hardened cement physically stabilize the wellbore pipe, but it also inhibits the unwanted migration of fluids between different zones of the wellbore via the annular space. In addition to filling the annular space of a wellbore, cements can be used to plug lost circulation and outflow zones in a wellbore, repair cracks and holes in a previously cemented wellbore, as well as to accomplish other well remediation operations. Further, cements can be used to permanently close a wellbore that is no longer in production and is being abandoned.

The rate of curing of a cement to form a hardened state may ultimately determine the success of a downhole cementing operation. More generally, the rate of curing may determine whether a particular cement can be effectively used in a given application. When introduced into a subterranean formation, the uncured cement may be exposed to high temperatures that can lead to undesirably rapid curing in some cases. When curing occurs more rapidly than desired, a set retarder may be added to the uncured cement in order to delay its cure. On the other hand, it may sometimes be desirable to accelerate the curing of a cement slurry by adding a setting accelerator. For example, when a subterranean formation is very porous, it may be desirable for the cement slurry to be set as soon as feasible after being delivered to a desired location in order to limit cement leak off into the formation.

When cementing the annular space of normal oil and gas wellbores, correct placement of an uncured cement therein is ordinarily not a particularly pressing concern, since the cement's curing time can normally be modulated as needed through use of set retarders or set accelerators. In addition, the relatively large annular spaces of these types of wellbores do not make it particularly difficult to introduce cement thereto.

In contrast to oil and gas wellbores, boreholes utilized for mineral exploration beneath the earth's surface are generally much smaller in size. For example, when conducting wireline operations in mineral exploration boreholes, the annular space within the borehole may be only a few millimeters wide. Mineral exploration may involve mapping a subterranean space for a mineral deposit. Mineral deposits may include both precious and non-precious metals, non-metals, and any compound thereof (i.e., metal ores).

Like typical oil and gas wellbores, it can sometimes be desirable to perform cementing operations in wellbores used for mineral exploration. However, the very narrow annular spaces in such wellbores may make effective delivery and proper placement of the uncured cement very difficult. Specifically, under-pumping or, more likely, over-pumping of the uncured cement can commonly occur when cementing mineral exploration wellbores. Under-pumping or over-pumping can result in the delivery of the cement to a location in the wellbore where cementing is not desired or, even worse, to a location that damages the wellbore. Further, the types of cementing equipment typically used for cementing oil and gas wellbores may not be capable of being adapted for cementing mineral exploration wellbores without significantly modifying the uncured cement. Significant modifications to the cement may result in unintended consequences, such as changing its curing rate or mechanical strength when hardened.

In addition to the foregoing, proper retention of water in the uncured cement may be difficult to maintain for effective cement curing and delivery to take place. Especially if the wellbore is highly porous, loss of water from the uncured cement can prevent it from curing properly, even if delivered to a desired location in a wellbore. Poor curing can render the cement ineffective for its intended purpose in the wellbore. Poor cement jobs can lead to a reduced ability to core a mineral deposit, either in having to collect a reduced core size or not having the ability to core certain sections of the mineral deposit. Having a reduced ability to core may, in turn, affect the valuation of a project. Another problem caused by water loss from the uncured cement can be loss of fluidity of the cement slurry, which may again result in the cement being delivered to a location different than that intended.

SUMMARY OF THE INVENTION

The present invention generally relates to cementing, and, more specifically, to methods for cementing within confined locales and cement compositions adapted for the same.

In some embodiments, the present disclosure provides methods comprising: providing a cement composition comprising a cement and a property control package, the property control package comprising: a filtration control agent; a friction reducer; and a setting accelerator; introducing the cement composition into a mineral exploration wellbore; and setting the cement composition in the wellbore.

In some embodiments, the present disclosure provides methods comprising: providing a cement composition comprising a cement and a property control package, the property control package comprising: about 0.3% to about 1% filtration control agent by weight of cement; about 0.3% to about 1% friction reducer by weight of cement; and about 1% to about 4% setting accelerator by weight of cement; introducing the cement composition into a wellbore penetrating a subterranean space; and setting the cement composition in the wellbore.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and the benefit of this disclosure.

DETAILED DESCRIPTION

Figure 1:
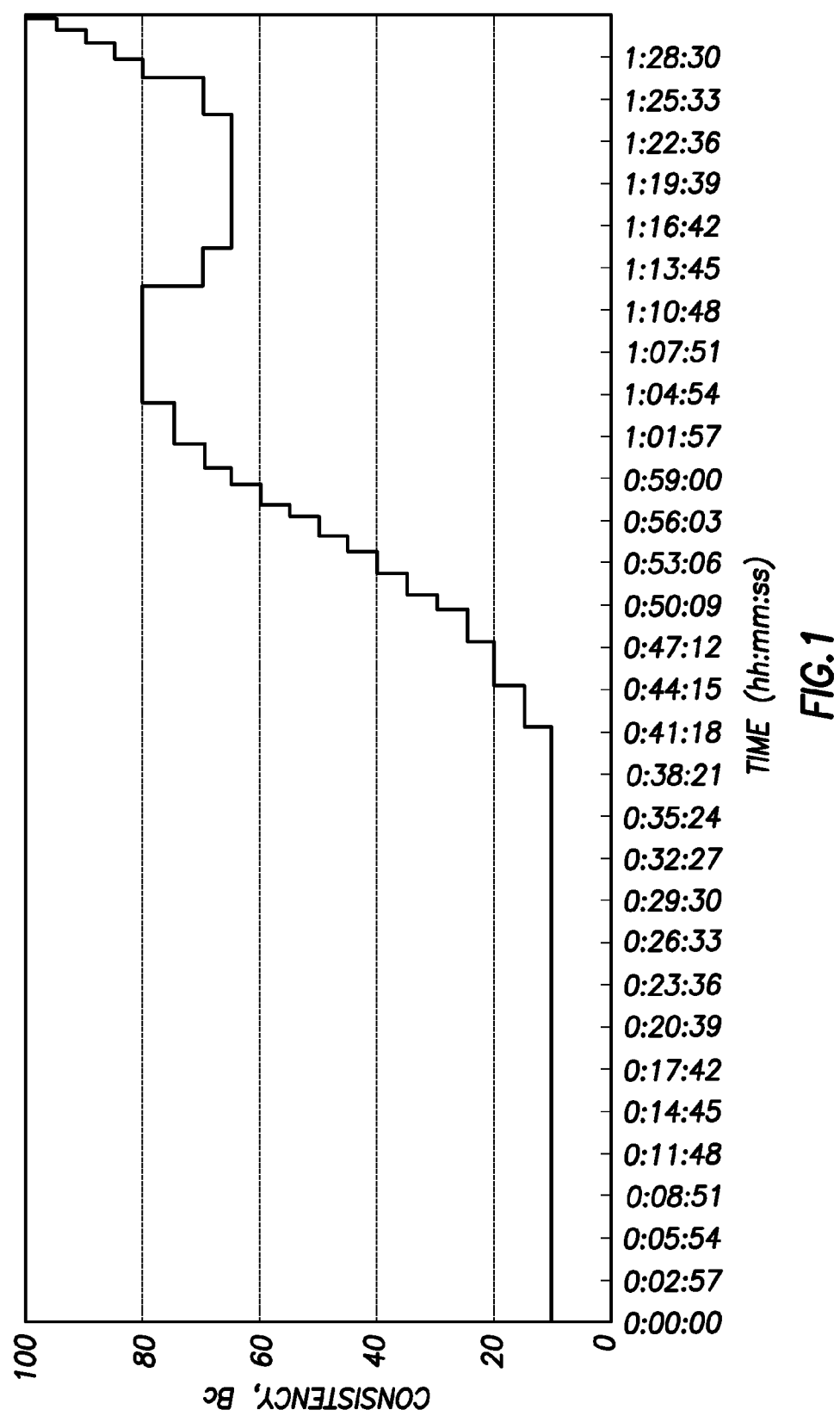
FIGS. 1-6 show illustrative plots of the consistency of cement samples 1-6 over time.

The present invention generally relates to cementing, and, more specifically, to methods for cementing within confined locales and cement compositions adapted for the same.

In order to address the difficulties associated with cementing in confined locales, particularly wellbores having narrow annular spaces, we designed a combination of additives that may be added as a property control package to desirably change the properties of uncured cements in a synergistic manner. The property control packages described herein both improve the ease with which the uncured cements may be introduced to wellbores as well as change their curing rate. Altering these two features in concert with one another may address particular difficulties associated with pumping very viscous uncured cements, especially to mineral exploration wellbores and other confined locales.

To facilitate the ease of pumping the uncured cements, the property control packages described herein contain both a friction reducer and a filtration control agent. The filtration control agent helps to maintain fluidity of the uncured cements by reducing water loss from their matrix. In addition, the filtration control agent desirably maintains sufficient water in the cements for effective curing to take place. Likewise, the friction reducer makes pumping of the uncured cements less difficult.

Despite the foregoing advantages of modifying cements with a filtration control agent and a friction reducer, the presence of one or both substances may significantly increase the time needed for the cement to effectively cure. That is, one or both of these substances may function as set retarders. Thus, in addition to the friction reducer and the filtration control agent, the property control packages described herein also include a setting accelerator. The setting accelerator may counteract the set retarding effects of the filtration control agent and/or the friction reducer and thereby increase the curing rate of the cement. Incorporation of a setting accelerator in the property control packages may be particularly desirable, since it may be favorable to achieve a rapid cure of the cement once it has reached its intended destination. For example, it may be desirable to cure the cement as rapidly as possible once in its intended destination so that the cement does not migrate to a location where it is unwanted and may possibly be detrimental. Moreover, it may be advantageous to include a setting accelerator in the property control packages to further counteract the effects of the friction reducer and/or the filtration control agent relating to their tendency to increase the fluidity of the uncured cement and make it more difficult to retain in a desired location. In addition to facilitating placement of the cement in a desired location, more rapid setting of the cement may advantageously allow downhole operations to resume sooner than would otherwise be possible for longer set times.

Advantageously, the property control packages described herein may be formulated as a "single sack" combination of dry components for admixture with a cement during its preparation and manufacture. Although the foregoing components of the property control packages described herein may provide beneficial effects (e.g., a desired curing rate and easy pumpability) when used in combination with one another, they are not believed to chemically interact directly with one another, either positively or negatively, particularly in a dry or powdered state, thereby allowing their ready combination with one another for later inclusion in a cement. As an alternative, the components of the property control packages may be combined directly with a dry cement and become distributed therein during mixing of the cement with water. At the present time, the inventors do not believe that there has been any contemplation in the art to combine a friction reducer, a filtration control agent, and a setting accelerator in a property control package in the manner described herein, particularly for use in cements introduced to mineral exploration wellbores.

In addition to the foregoing advantages, the property control packages described herein do not appreciably degrade the mechanical strength of the cement after curing. Accordingly, cements modified using the property control packages described herein may be used analogously to unmodified cements. Since cements modified with a property control package may be used analogously to unmodified cements, little or no engineering and design changes may be needed when employing the property control packages in a cement.

As noted above, it may be difficult to introduce cements to confined spaces in a controlled manner due to the common problem of over- or under-pumping the uncured cement. The advantages offered by the presently described property control packages may address this difficulty, particularly for cementing operations conducted in confined spaces such as mineral exploration wellbores, for example. Further, since the volume of cement placed in a confined space is relatively small, it is preferable that the cement have desired characteristics for performing its intended function. The property control packages described herein may help meet this need. In addition to addressing cement properties and over- or under-pumping, cements modified with the property control packages described herein may be combined with cement and delivered downhole using conventional cementing equipment and techniques, even in mineral exploration wellbores. Thus, use of the property control packages in cementing operations advantageously does not require the development of costly engineering and hardware solutions for effective cementing to take place.

In some embodiments, methods described herein may comprise: providing a cement composition comprising a cement and a property control package that comprises a filtration control agent, a friction reducer, and a setting accelerator; introducing the cement composition into a mineral exploration wellbore; and setting the cement composition in the mineral exploration wellbore.

As used herein, the term "mineral exploration wellbore" refers to a wellbore used to probe a subterranean space for the presence of one or more minerals therein. As used herein, the term "mineral" refers to a metal or non-metal, or an ore thereof.

In some embodiments, the mineral exploration wellbore may comprise an annular structure having an annular space therein. The annular space may be defined by an inner structure and the walls of the wellbore. In some embodiments, the inner structure may comprise the wellbore pipe (i.e., drill string). In some embodiments, the mineral exploration wellbore may have an annular space of about 50 mm or less. In some embodiments, the mineral exploration wellbore may have an annular space of about 40 mm or less, or about 30 mm or less, or about 20 mm or less, or about 10 mm or less. In some embodiments, the mineral exploration wellbore may have an annular space ranging between about 3 mm and about 10 mm.

In some embodiments, the cement may be introduced into the wellbore via the inner structure. For example, in some embodiments, the inner structure may comprise a wellbore pipe, and the cement may be forced from the bottom of the wellbore up the annular space. In some or other embodiments, the cement may be introduced directly to the annular space. As described above, conventional cementing techniques may be employed to place the cement in a desired location in the wellbore when it is introduced by either manner.

In addition to or as an alternative to placement in the annular space, cements modified with the property control packages described herein may be placed at other locations within the wellbore. In some embodiments, the cements may be placed in a lost circulation zone. In some embodiments, the cements may be placed about a wedge within the wellbore. As used herein, the term "wedge" refers to a structure that is placed downhole to change the direction of the borehole. In some cases, the wedge may be cemented in place and then used to direct drilling. In still other embodiments, the cements may be at least partially placed in the subterranean space itself (e.g., in fractures) so as to reduce porosity and fluid loss thereto. In still other embodiments, the cements may be used to seal the wellbore once access to the borehole is no longer needed.

In some embodiments, providing a cement composition comprising a cement and a property control package may comprise adding the cement to the property control package. In other embodiments, providing the cement composition may comprise adding the property control package to the cement. In some embodiments, providing the cement composition may comprise combining a dry mixture of the property control package with water and adding the cement thereto, thereby forming a cement slurry. In some embodiments, providing the cement composition may comprise combining the cement with water, and adding the cement in water to the property control package, thereby forming a cement slurry. In some embodiments, providing the cement composition may comprise combining a dry mixture of the property control package with water and the cement with water, and adding the cement in water to the property control package in water, thereby forming a cement slurry. In some embodiments, providing the cement composition may comprise combining a dry mixture of the property control package with water and the cement with water, and adding the property control package in water to the cement in water, thereby forming a cement slurry. In still other embodiments, providing the cement composition may comprise combining the property control package and the cement as a dried mixture, and adding water thereto, thereby forming a cement slurry. As used herein, the term "cement slurry" will refer to a pumpable fluid comprising cement and water.

Suitable water sources for forming a cement slurry for use in the embodiments described herein may comprise any water that does not appreciably affect setting of the cement. In various embodiments, the water source may comprise fresh water, salt water, sea water, surface water, ground water, waste water, aqueous salt solutions, saturated aqueous salt solutions, brine, and any combination thereof. Generally, the amount of water in the cement compositions should be sufficient to facilitate ready pumping of the uncured cement while still allowing setting to take place at a desired time.

Suitable setting accelerators may comprise substances such as, for example, alkali metal salts, alkaline earth metal salts, silicate salts, aluminates, and certain organic compounds. In more particular embodiments, suitable setting accelerators may comprise a calcium salt, a sodium salt, an amine, or any combination thereof. Suitable calcium salts that may function as setting accelerators include, but are not limited to, calcium chloride, calcium sulfate, calcium nitrate, calcium nitrite, calcium formate, and any combination thereof. Suitable sodium salts that may function as setting accelerators include, but are not limited to, sodium chloride, sodium thiocyanate, sodium sulfate, and any combination thereof. Suitable amines that may function as setting accelerators include, but are not limited to, triethanolamine.

In some embodiments, the cement compositions described herein may comprise about 0.1% to about 10% of the setting accelerator by weight of cement. In other embodiments, the cement compositions may comprise about 1% to about 4% of the setting accelerator by weight of cement.

Filtration control agents suitable for use in the embodiments described herein are not believed to be particularly limited and may include any type of substance capable of providing fluid loss control. The form of the fluid loss control additive may comprise various forms such as, for example, fibers, flakes, sheets, powders, crystalline solids, and the like. Suitable filtration control agents may comprise cellulose derivatives (e.g., modified guars, hydroxyethylcellulose, carboxymethylcellulose, carboxymethyl hydroxyethyl cellulose), latex polymers, and copolymers of acrylamido-2-methyl-2-propanesulfonic acid, particularly copolymers with N,N-dimethylacrylamide. Suitable copolymers of acrylamido-2-methyl-2-propanesulfonic acid that may be used for filtration control are described in U.S. Pat. Nos. 4,015,991, 4,515,635, 4,555,269, 4,676,317, 4,703,801, 5,339,903, and 6,268,406, each of which is incorporated herein by reference in its entirety. One example of a suitable fluid loss control additive that may be used in the embodiments described herein is HALAD-344, which is commercially available from Halliburton Energy Services.

In some embodiments, the cement compositions described herein may comprise about 0.05% to about 5% of the filtration control agent by weight of cement. In other embodiments, the cement compositions may comprise about 0.3% to about 1% of the filtration control agent by weight of cement.

Friction reducers suitable for use in the embodiments described herein may comprise friction reducing polymers such as synthetic polymers, natural polymers, and viscoelastic surfactants. As used herein, the term "friction reducing polymer" will refer to a polymer that reduces energy losses due to turbulence in a flowing fluid. Friction reducing polymers suitable for use in the embodiments described herein may be ionic or neutral. In some embodiments, suitable friction reducing polymers may comprise partially hydrolyzed polyacrylamides (e.g., copolymers of acrylamide and acrylic acid), or copolymers of acrylamide and acrylate esters. In some embodiments, suitable friction reducing polymers may comprise a reaction product of acetone, formaldehyde, and sulfurous acid or a sulfurous acid salt. Other suitable friction reducing polymers may include, for example, diutan gums, xanthan gums, galactomannan, and cellulose derivatives, including guar derivatives. One example of a suitable friction reducer that may be used in the embodiments described herein is CFR-3, which is commercially available from Halliburton Energy Services.

In some embodiments, the cement compositions described herein may comprise about 0.05% to about 5% of the friction reducer by weight of cement. In other embodiments, the cement compositions may comprise about 0.3% to about 1% of the friction reducer by weight of cement.

Cements suitable for use in combination with the property control packages described herein are not believed to be particularly limited. In some embodiments, suitable cements may comprise Portland cements, including Types I, II, III, IV, or V Portland cements, each of which will be familiar to one having ordinary skill in the art. In some or other embodiments, suitable cements may include, for example, blast furnace slag cement, fly ash cement, trass cement, Pozzolan-lime cement, slag-lime cement, supersulfated cement, gypsum cement, phosphate cement, silica cement, calcium aluminate cement, calcium sulfoaluminate cement, or any combination thereof.

In some embodiments, methods described herein may comprise: providing a cement composition comprising a cement and a property control package, the property control package comprising: about 0.3% to about 1% filtration control agent by weight of cement; about 0.3% to about 1% friction reducer by weight of cement; and about 1% to about 4% setting accelerator by weight of cement; introducing the cement composition into a wellbore penetrating a subterranean space; and setting the cement composition in the wellbore.

In some embodiments, the subterranean space may comprise a mineral formation. In some embodiments, the wellbore penetrating the subterranean space may comprise a mineral exploration wellbore. The type of mineral formation penetrated by the wellbore is not believed to be particularly limited and can include formations containing metals or their ores such as, for example, gold, silver, platinum, palladium, copper, nickel, rare earth metals, and the like. In some embodiments, the mineral formation may contain a non-metal or an ore thereof therein. In some embodiments, the methods described herein may further comprise harvesting a mineral from the subterranean formation. Techniques for mineral harvesting will be familiar to one having ordinary skill in the art.

It is to be recognized that in some embodiments, the cement compositions or property control packages described herein may further comprise additional components used in the cementing arts. Such additional components may include, for example, manganese tetroxide, iron oxide, silica flour, fly ash, sand, hardening agents, rheology modifiers, crosslinking agents, foaming agents, defoaming agents, organic solvents, polymers, polymerizable monomers, polymerization initiators, polymerization inhibitors, microspheres, fibers, dispersants, density-increasing additives, density-reducing additives, surfactants, weighting agents, viscosifying agents, any combination thereof, and the like.

To facilitate a better understanding of the present invention, the following examples of preferred embodiments are given. In no way should the following examples be read to limit, or to define, the scope of the invention.

EXAMPLES

Cement compositions were formulated as set forth in Table 1. In each case, the friction reducer (CFR-3, a friction reducing polymer available from Halliburton Energy Services), HALAD-344 (a filtration control agent available from Halliburton Energy Services), and calcium chloride were combined as a dry mixture and slowly added to deionized water in a Lightning Mixer until dispersed. The Lightning Mixer was operated at approximately 1000 RPM using a strait-type X3 mixer blade. After dispersing the components of the property control package in water for approximately 1-2 minutes, the cement was gradually added to the water and mixing was continued thereafter.

TABLE 1

| Sample # | Water (mL) | Cement (g) | CFR-3 (g) | HALAD-344 (g) | Calcium Chloride (g) | TOTAL MASS (g) |
| --- | --- | --- | --- | --- | --- | --- |
| 1 | 350 | 760 | 2.28 | 2.28 | 7.59 | 1122.15 |
| 2 | 350 | 760 | 2.28 | 4.56 | 7.59 | 1124.43 |
| 3 | 350 | 760 | 2.28 | 7.59 | 7.59 | 1127.46 |
| 4 | 350 | 660 | 1.97 | 1.97 | 6.58 | 1020.52 |
| 5 | 350 | 660 | 1.97 | 3.94 | 6.58 | 1022.49 |
| 6 | 350 | 660 | 1.97 | 6.58 | 6.58 | 1025.13 |

Figure 2:
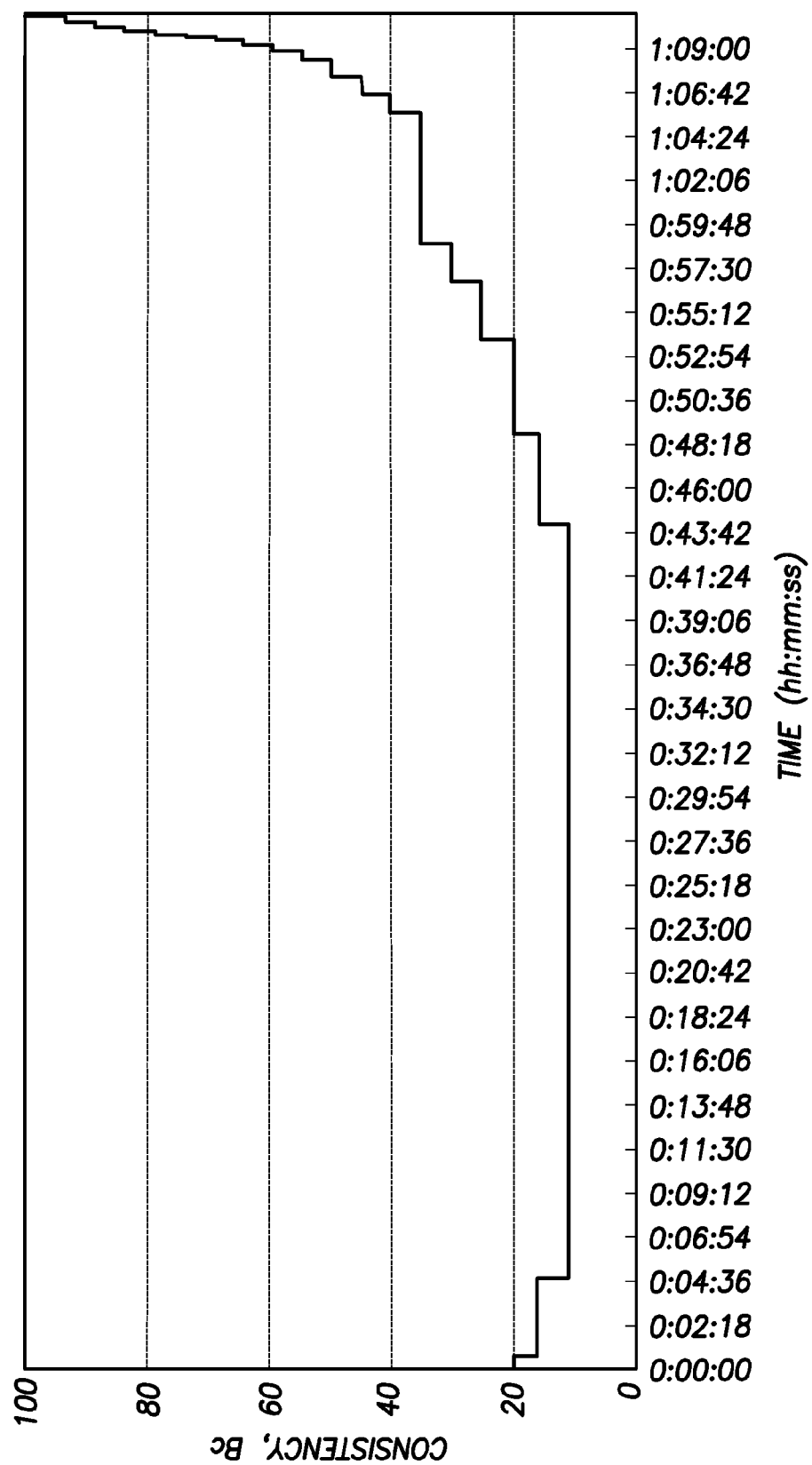
Figure 3:
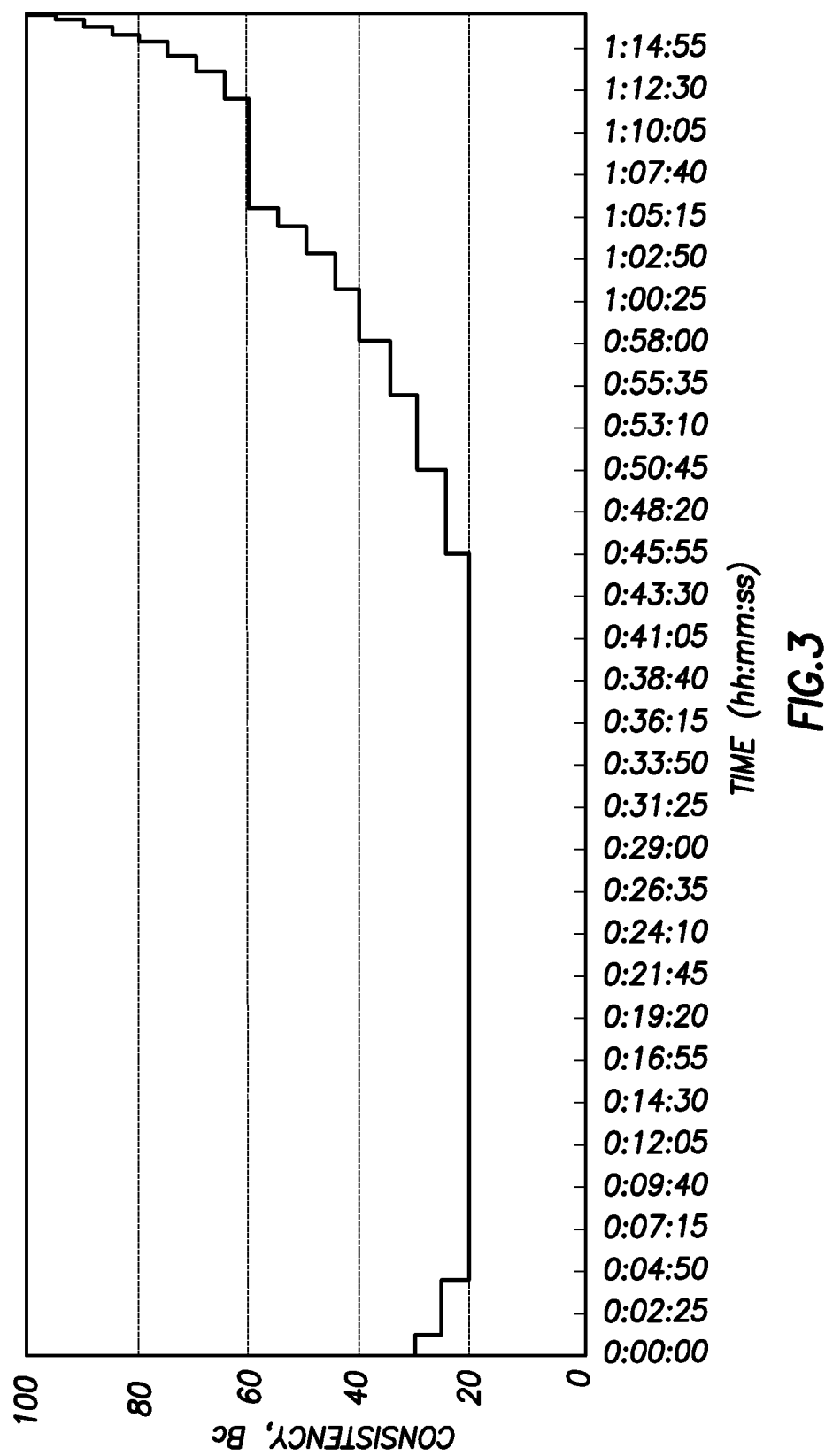
Figure 4:
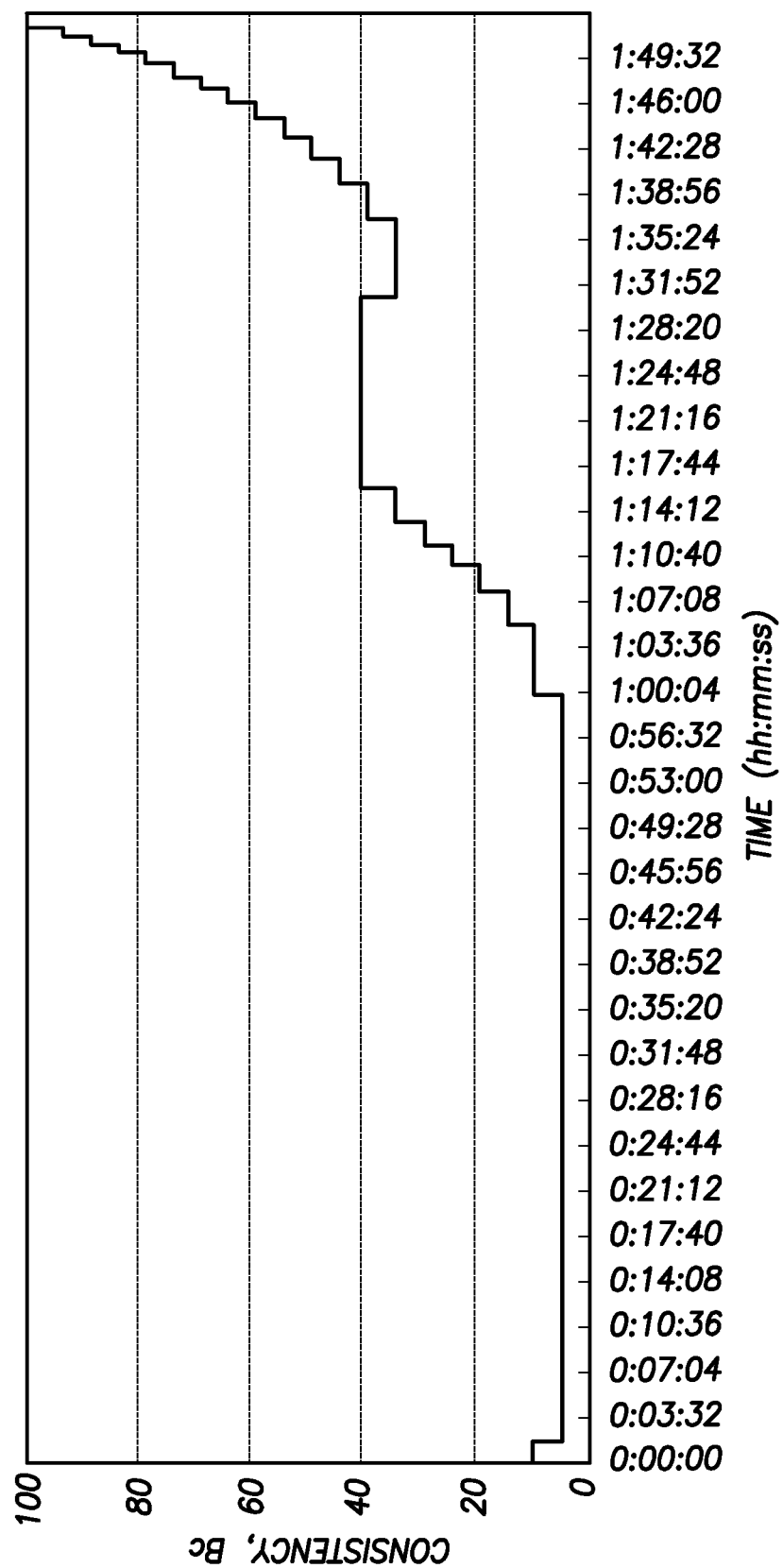
Figure 5:
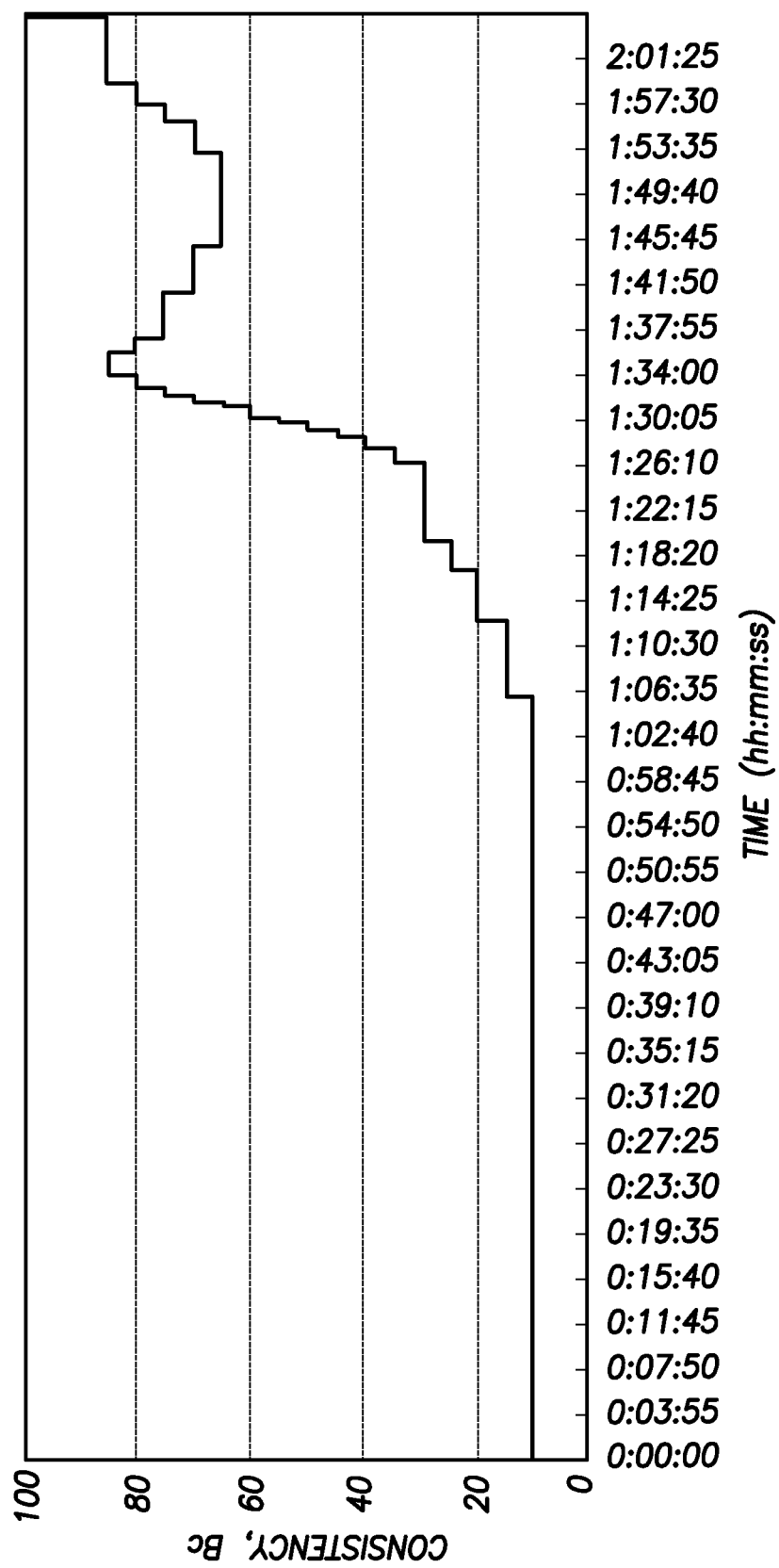
Figure 6:
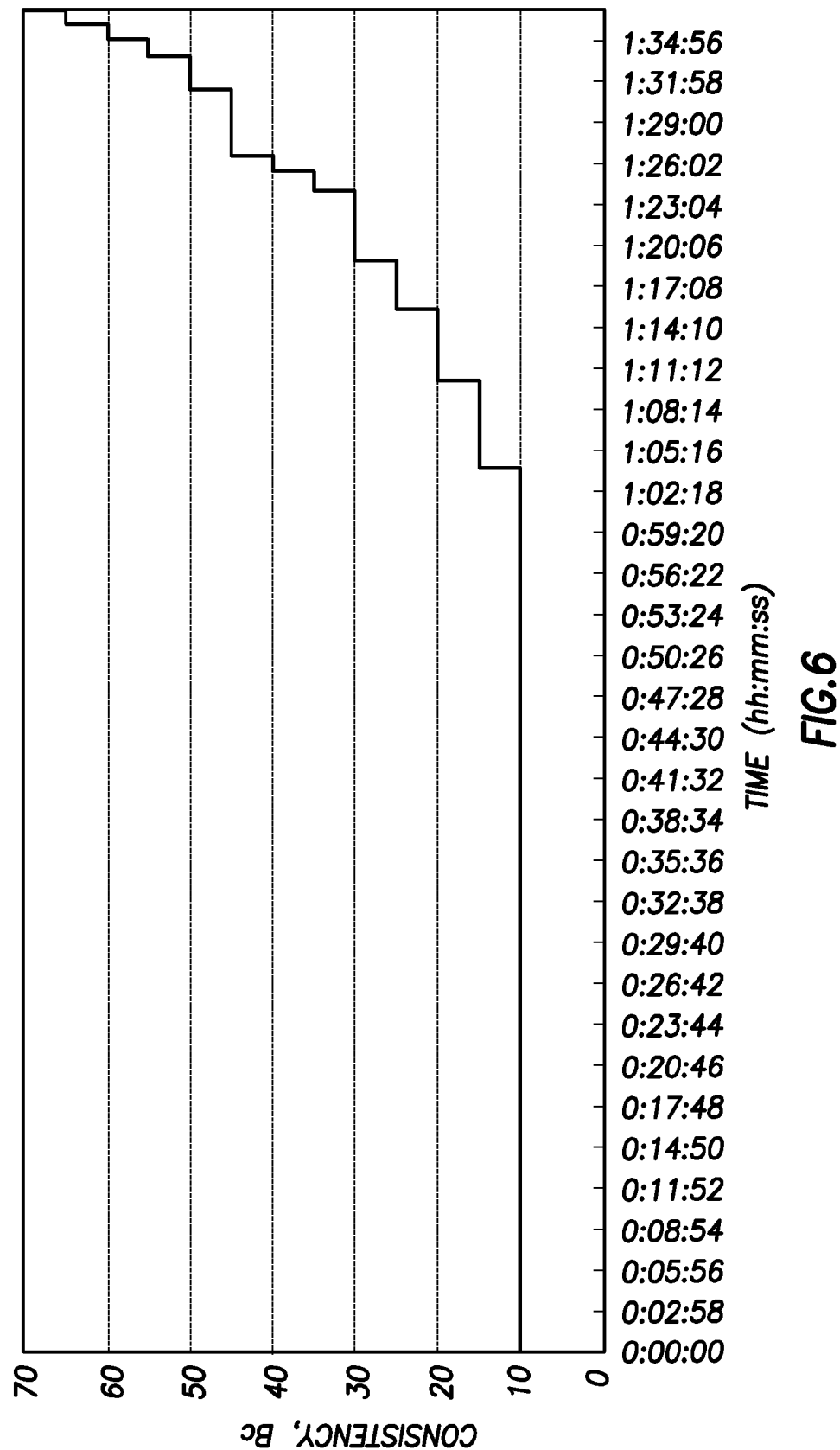

Filtrate loss of the samples was evaluated immediately after mixing by collecting filtrate for 30 minutes. Compressive strength was measured 24 hours after mixing using a Carver compression press. Attempts were also made to measure the compressive strength at 4 hours after mixing, but the samples were not yet adequately set. Consistency measurements were made in an atmospheric pressure consistometer at 150° F. and measurements were recorded over time until reaching a maximum measurement of 100 Bc. Filtrate loss and compressive strength measurements of the samples are summarized in Table 2. Times to reach various set Bearden consistency (Bc) measurements are summarized in Table 3. FIGS. 1-6 show illustrative plots of the consistency of cement samples 1-6 over time.

TABLE 2

| Sample # | Filtrate Loss Over 30 Minutes (mL) | Compressive Strength (psi) |
| --- | --- | --- |
| 1 | 29.0 | 4200 |
| 2 | 8.2 | >5000 |
| 3 | 5.8 | >5000 |
| 4 | 29.0 | 4000 |
| 5 | 25.3 | 3000 |
| 6 | 10.2 | 3500 |

TABLE 3

| Sample # | Time to 50 Bc Units | Time to 70 Bc Units | Time to 100 Bc Units |
| --- | --- | --- | --- |
| 1 | 00:55:01 | 00:59:40 | 01:31:07 |
| 2 | 01:07:53 | 01:09:54 | 01:11:05 |
| 3 | 01:03:20 | 01:13:38 | 01:16:55 |
| 4 | 01:42:30 | 01:47:56 | 01:52:54 |
| 5 | 01:29:09 | 01:31:34 | 02:05:10 |
| 6 | 01:32:09 | 01:37:47 | N/A |

As illustrated by the FIGURES and the data above, the rate of setting and the ultimate mechanical strength obtained was readily altered by modifying the cement compositions. Sample 3 offered a particularly suitable combination of properties, possessing both low filtrate loss and high mechanical strength.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a cement composition comprising a cement and a property control package, the property control package comprising:
a filtration control agent;
a friction reducer; and
a setting accelerator;
introducing the cement composition into a mineral exploration wellbore, the mineral exploration wellbore penetrating a mineral formation containing a mineral deposit;
wherein the mineral deposit comprises a metal or a metal ore;
setting the cement composition in the wellbore; and
mapping the mineral deposit, or harvesting the mineral deposit from the mineral formation.

2. The method of claim 1, wherein the wellbore comprises an annular structure having an annular space ranging between about 3 mm and about 10 mm.

3. The method of claim 2, wherein the cement composition is set in the annular space.

4. The method of claim 1, wherein the cement composition is set in a lost circulation zone.

5. The method of claim 1, wherein the setting accelerator comprises a substance selected from the group consisting of a calcium salt, a sodium salt, an amine, and any combination thereof.

6. The method of claim 5, wherein the setting accelerator comprises a calcium salt or a sodium salt selected from the group consisting of calcium chloride, calcium sulfate, calcium nitrate, calcium nitrite, calcium formate, sodium thiocyanate, sodium sulfate, sodium chloride, and any combination thereof.

7. The method of claim 1, wherein the filtration control agent comprises a cellulose derivative, a latex polymer, or a copolymer of acrylamido-2-methyl-2-propanesulfonic acid and N,N-dimethylacrylamide.

8. The method of claim 1, wherein the friction reducer comprises a friction reducing polymer.

9. The method of claim 8, wherein the friction reducing polymer comprises a reaction product of acetone, formaldehyde, and sulfurous acid or a sulfurous acid salt.

10. The method of claim 1, wherein the cement comprises at least one cement selected from the group consisting of Portland cement, blast furnace slag cement, fly ash cement, trass cement, Pozzolan-lime cement, slag-lime cement, supersulfated cement, gypsum cement, phosphate cement, silica cement, calcium aluminate cement, calcium sulfoaluminate cement, and any combination thereof.

11. The method of claim 1, wherein providing the cement composition comprises combining a dry mixture of the property control package with water and then adding the cement, thereby forming a cement slurry.

12. The method of claim 1, wherein the cement composition comprises about 0.3% to about 1% friction reducer by weight of cement.

13. The method of claim 1, wherein the cement composition comprises about 0.3% to about 1% filtration control agent by weight of cement.

14. The method of claim 1, wherein the cement composition comprises about 1% to about 4% setting accelerator by weight of cement.

15. A method comprising:
providing a cement composition comprising a cement and a property control package, the property control package comprising:
about 0.3% to about 1% filtration control agent by weight of cement;
about 0.3% to about 1% friction reducer by weight of cement; and
about 1% to about 4% setting accelerator by weight of cement;
introducing the cement composition into a mineral exploration wellbore penetrating a mineral formation containing a mineral deposit;
wherein the mineral deposit comprises a metal or a metal ore;
setting the cement composition in the wellbore; and
mapping the mineral deposit, or harvesting the mineral deposit from the mineral formation.

16. The method of claim 15, wherein the wellbore comprises an annular structure having an annular space ranging between about 3 mm and about 10 mm.

17. The method of claim 15, wherein the setting accelerator comprises a substance selected from the group consisting of a calcium salt, a sodium salt, an amine, and any combination thereof.

18. The method of claim 17, wherein the setting accelerator comprises a calcium salt or a sodium salt selected from the group consisting of calcium chloride, calcium sulfate, calcium nitrate, calcium nitrite, calcium formate, sodium thiocyanate, sodium sulfate, sodium chloride, and any combination thereof.

19. The method of claim 15, wherein the filtration control agent comprises a cellulose derivative, a latex polymer, or a copolymer of acrylamido-2-methyl-2-propanesulfonic acid and N,N-dimethylacrylamide.

20. The method of claim 15, wherein the friction reducer comprises a friction reducing polymer.

21. The method of claim 20, wherein the friction reducing polymer comprises a reaction product of acetone, formaldehyde, and sulfurous acid or a sulfurous acid salt.

* * * * *